(12) United States Patent
Ikeda (10) Patent No.: US 7,459,685 B2
(45) Date of Patent: Dec. 2, 2008

(54) IMAGING DEVICE AND METHOD, COMPUTER PROGRAM PRODUCT ON COMPUTER-READABLE MEDIUM, AND IMAGING SYSTEM

(75) Inventor: Yukio Ikeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 179 days.

(21) Appl. No.: 11/405,564

(22) Filed: Apr. 18, 2006

(65) Prior Publication Data

US 2006/0266942 A1 Nov. 30, 2006

(30) Foreign Application Priority Data

May 26, 2005 (JP) ............................. 2005-154445

(51) Int. Cl.
*G02B 26/10* (2006.01)
(52) U.S. Cl. ..................................... 250/334
(58) Field of Classification Search ................. 250/334; 359/630
See application file for complete search history.

(56) References Cited

U.S. PATENT DOCUMENTS 5,001,558 A * 3/1991 Burley et al. ................ 348/164
6,281,970 B1 * 8/2001 Williams et al. .......... 356/141.4
2004/0196566 A1 * 10/2004 Beystrum et al. ............ 359/630
2006/0175549 A1 * 8/2006 Miller et al. ................. 250/334

FOREIGN PATENT DOCUMENTS

| EP | 1 030 519 A2 | 8/2000 |
|---|---|---|
| JP | 10-108163 | 4/1998 |
| JP | 2000-243062 | 9/2000 |

* cited by examiner

*Primary Examiner*—David P. Porta
*Assistant Examiner*—Kiho Kim
(74) *Attorney, Agent, or Firm*—Oblon, Spivak, McClelland, Maier & Neustadt, P.C.

(57) ABSTRACT

An imaging device and methodology for sequentially adjusting an imaging direction to generate color unit images that together form a color panoramic image are provided. The imaging direction is sequentially adjusted to generate infrared unit images that together form an infrared panoramic image. The color panoramic image is produced by overlaying the color unit images, one color unit image on another, and the infrared panoramic image is produced by overlaying the infrared unit images, one infrared image on another. A resultant image is synthesized from the color panoramic image and the infrared panoramic image by overlaying, on an infrared image of an object, a color image corresponding to the location where the object has been imaged in infrared, and the resultant image is displayed.

8 Claims, 9 Drawing Sheets

IMAGING DEVICE AND METHOD, COMPUTER PROGRAM PRODUCT ON COMPUTER-READABLE MEDIUM, AND IMAGING SYSTEM

CROSS REFERENCES TO RELATED APPLICATIONS

The present invention contains subject matter related to Japanese Patent Application JP 2005-154445 filed in the Japanese Patent Office on May 26, 2005, the entire content of which is incorporated herein by reference.

BACKGROUND OF THE INVENTION

1. Field of the Invention

The present invention relates to an imaging device and method, computer program product on a computer-readable medium and an imaging system, for surveillance of a wide-range scene by means of a panoramic image obtained by imaging with sequential shifting of the imaging direction.

2. Description of the Related Art

In the electronic still cameras having been used widely in the past, light having passed through a lens by releasing the shutter of the camera to image an object can be converted into an image signal by a solid-state image sensor such as CCD (charge-coupled device) and the image signal be recorded to a recording medium. The image signal once recorded can be read out of the recording medium for reproduction. Many of the electronic still cameras have a monitor capable of displaying a captured still image and on which a selected one of the still images having so far been recorded in the recording medium can be displayed. In the electronic still camera, an image signal supplied to the monitor corresponds to an object per screen. For this reason, each of the images displayed simultaneously on the monitor is limited in size and thus cannot be used for simultaneous surveillance of any wide-range scene.

On this account, there have been more and more prevailing surveillance cameras permitting surveillance of a wide-range scene by imaging an object with sequential shifting of the imaging direction to produce a panoramic image formed from a plurality of unit images. Recently, there have been proposed a technique of shrinking/synthesizing a plurality of video signals to produce a video signal of one frame (as in the Japanese Patent Application Laid Open No. 108163 of 1998) and also a centralized surveillance/recording system capable of collecting surveillance video signals from a plurality of existing surveillance video cameras and recording the signals to a recording medium such as video tape for the purpose of surveillance (as in the Japanese Patent Application Laid Open No. 2000-243062).

SUMMARY OF THE INVENTION

In case such a surveillance camera is installed in an off-limits area (restricted area), it will be the most important problem to make a "most efficient and pinpoint" imaging of only a person or the like going into such an off-limits area.

However, to detect some change in an imaging range while watching surveillance images recorded in a recording medium such as video tape as above, the observer should watch a surveillance image supplied at each scan in detail. The observer has to always be careful not to overlook even a small change of the image under observation, appearance of a very small object, etc., which requires too much labor and time. Further, since the surveillance/monitoring system depends on the observer's eyes, he or she may possibly fail to find such changes of a scene.

For making surveillance of such an area at night, the observer should be very careful not to fail in finding any intruder in a dark image captured by the camera under insufficient light. Especially, in case the range of a scene under surveillance is wider, it is extremely difficult to find such an intruder.

Furthermore, since the image captured by the camera at night is so dark itself that it is not possible to know details of an intrusion, that is, from which part of which building a person has entered the off-limits area or through which route the intruder has moved. The wider the range of a scene under surveillance, the more difficult it is to know the above details.

Also, video information captured by an infrared camera capable of imaging an object irrespective of the illuminance of the object is converted into a monochromatic image for outputting to outside. So, in case an object poor in variation of shape and temperature distribution is imaged, it is difficult in many cases to verify a target and scene around the target.

It is therefore desirable to overcome the above-mentioned drawbacks of the related art by providing an imaging device and method, capable of making night-and-day, wide-range surveillance of a specific object such as persons in relation to its background, computer program product on a computer-readable medium allowing a computer to control the operation of an imaging device in imaging by the imaging method, and an imaging system.

According to the present invention, there is provided an imaging device including:

a color imaging means for making color imaging with the imaging direction being sequentially adjusted for each of unit images forming together a panoramic image;

an infrared imaging means for imaging by infrared radiation measurement with the imaging direction being sequentially adjusted for each of unit images forming together a panoramic infrared image;

a panoramic image storing/managing means for storing/managing a panoramic color image produced by overlaying a plurality of unit images captured in colors by the color imaging means one on the other and a panoramic infrared image produced by overlaying a plurality of unit images captured by infrared radiation measurement by the infrared imaging means one on the other;

an image synthesizing means for overlaying, on an image of an object imaged by controlling the direction of imaging by the infrared imaging means to a desired one in a range of the imaging, a color image corresponding to a location, where the object has been imaged by the infrared imaging means, in a panoramic color image stored/managed in the panoramic image storing/managing means; and an image displaying means for displaying an image produced by the overlaying by the image synthesizing means.

According to the present invention, there is also provided an imaging method including the steps of:

making color imaging with the imaging direction being sequentially set for each of unit images forming together a panoramic image;

imaging by infrared radiation measurement with the imaging direction being sequentially set for each of unit images forming together a panoramic infrared image;

storing/managing a panoramic color image produced by overlaying a plurality of unit images captured in colors in the color imaging step one on the other and a panoramic infrared image produced by overlaying a plurality of unit images captured by infrared radiation measurement in the panoramic infrared imaging step one on the other;

imaging an object by infrared radiation measurement with the imaging direction being controlled to a desired one within the range imaging;

overlaying, on an infrared image of an object captured by infrared radiation measurement in the infrared imaging step, a color image corresponding to a location, where the object has been imaged in the infrared imaging step, in a panoramic color image stored/managed in the panoramic image storing/managing step; and displaying an image produced by the overlaying in the image synthesizing step.

According to the present invention, there is also provided a computer program product on a computer-readable medium, the computer program product allowing a computer to execute an imaging controlling process including the steps of:

making color imaging with the imaging direction being sequentially set for each of unit images forming together a panoramic image;

imaging by infrared radiation measurement with the imaging direction being sequentially set for each of unit images forming together a panoramic infrared image;

storing/managing a panoramic color image produced by overlaying a plurality of unit images captured in colors in the color imaging step one on the other and a panoramic infrared image produced by overlaying a plurality of unit images captured by infrared radiation measurement in the panoramic infrared imaging step one on the other;

imaging an object captured by infrared radiation measurement with the imaging direction being controlled to a desired one within the range imaging;

overlaying, on an infrared image of an object imaged captured by infrared radiation measurement in the infrared imaging step, a color image corresponding to a location, where the object has been imaged in the infrared imaging step, in a panoramic color image stored/managed in the panoramic image storing/managing step; and displaying an image produced by the overlaying in the image synthesizing step.

According to the present invention, there is also provided an imaging system including:

a color imaging device for making color imaging with the imaging direction being sequentially adjusted for each of unit images forming together a panoramic image;

an infrared imaging device for imaging by infrared radiation measurement with the imaging direction being sequentially adjusted for each of unit images forming together a panoramic infrared image; and a controller to control the operations of the color imaging device and infrared imaging device via a network, the controller including:

a panoramic image storing/managing means for storing/managing a panoramic color image produced by overlaying a plurality of unit images captured in colors by the color imaging device one on the other and a panoramic infrared image produced by overlaying a plurality of unit images captured by infrared radiation measurement by the infrared imaging device one on the other;

an image synthesizing means for overlaying, on an image of an object imaged by controlling the direction of imaging by the infrared imaging device to a desired one in a range of the imaging, a color image corresponding to a location, where the object has been imaged by the infrared imaging device, in a panoramic color image stored/managed in the panoramic image storing/managing means; and an image displaying means for displaying an image produced by the overlaying by the image synthesizing means.

According to the present invention, a color image corresponding to an imaging position of an object in a panoramic color image is overlaid on an infrared image obtained by imaging the object by infrared radiation measurement with the imaging direction being controlled to a desired one in an imaging range to produce a synthetic image to be displayed. Therefore, an area where the object exists can be displayed as a luminance distribution of the infrared image even at night, and thus the position of the area where the object exists in a relation with its background as well can definitely be identified. Also, since it is possible to prevent overlooking of any slight motion of a human being, the prevent invention permits a higher-definition surveillance/monitoring.

DETAILED DESCRIPTION OF THE PREFERRED EMBODIMENTS

The present invention will be described in detail below concerning embodiments thereof with reference to the accompanying drawings.

Figure 1:
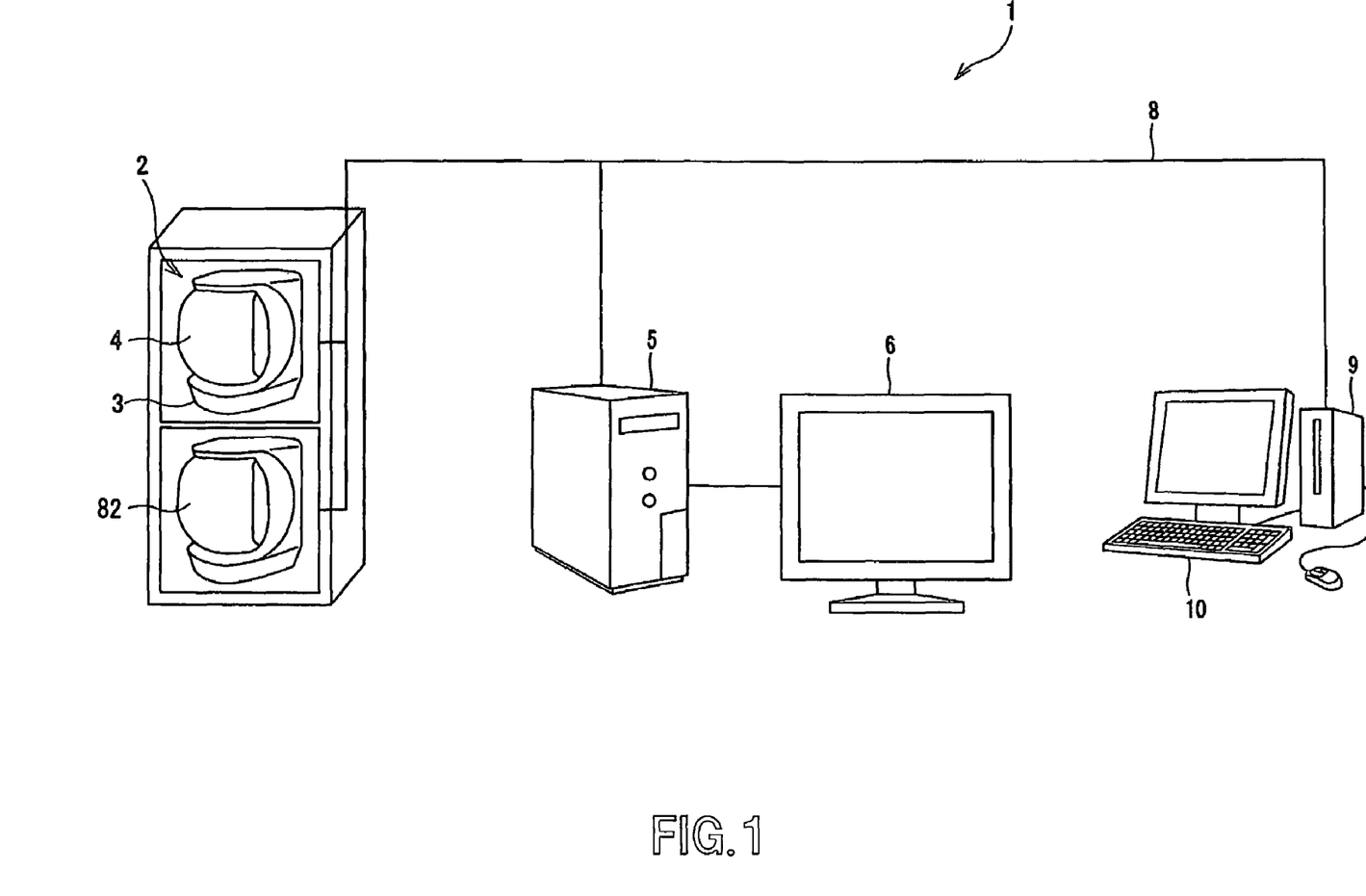
FIG. 1 illustrates the construction of the surveillance/monitoring system according to the present invention.

The present invention is applied to a surveillance/monitoring system 1 constructed as shown in FIG. 1, for example.

The surveillance/monitoring system 1 includes a visible-light color camera unit 2 to produce an image signal by imaging an object, infrared camera 82, monitor 5 supplied with the image signal from at least the color camera unit 2, display 6 connected to the monitor 5, terminal unit 9 used by a plurality of users to execute their applications, terminal display 10 connected to the terminal unit 9, and a network 8 to make two-way communications among the color camera unit 2, monitor 5 and terminal unit 9.

Of the surveillance/monitoring system 1, the color camera unit 2 is an integration of a pan/tilter 3 and camera block 4. The pan/tilter 3 is formed as a rotating platform that can be turned about tilting and panning axes, for example, to freely shift the imaging direction.

The camera unit 4 is installed on the pan/tilter 3 as the rotating platform to image an object while having its imaging direction shifted horizontally or vertically under the control of the monitor 5. Also, the camera block 4 images the object with its power being increased or decreased as the angle of view is changed under the control of the monitor 5. By providing a plurality of camera blocks 4 for one monitor 5, it is possible to image an object with the camera units at different angles of view, respectively, and thus obtain image information from multiple points of view.

The monitor 5 is composed of electronic devices such as a personal computer etc. It records image signals transmitted from the color camera unit 2 and infrared camera 82 and sends such recorded image signals to the display 6 for display to the user. Also, when the a desired portion or point of an image is designated by the user, the monitor 5 selects an optimum one of recorded image signals and controls the display 6 to display the designated image portion or point. The monitor 5 plays a roll of a so-called central controller to control the entire network 8 and sends an image to a terminal unit 9 upon request from the latter. It should be noted that the monitor 5 is constructed as will be described in detail later.

The network 8 is a public communications network capable of two-way communications of information such as the Internet connected to the monitor 5 via a telephone network, ISDN (Integrated Services Digital Network)/B-ISDN (broadband-ISDN) connected to a TA/modem or the like. It should be noted that in case the surveillance/monitoring system 1 is used in a fixed narrow area, the network 8 may be formed from a LAN (local area network). Also, the network 8 may be formed from a so-called optical fiber communications network. Further, the network 8 may be designed to send MPEG images as well as still images. In this case, MPEG data will continuously be sent from one channel and still image data will be sent at constant time intervals from another channel, according to the Internet Protocol (IP).

The terminal unit 9 is a personal computer (PC) by which the user in each home or business office acquires images from the monitor 5 via the network 8 to execute a desired processing of such image data. By connecting a plurality of terminal units 9 to the network 8, applications for the surveillance/monitoring system 1 can simultaneously be provided to the plurality of users. The terminal unit 9 displays images acquired from the monitor 5 on the terminal display 10. Also, the terminal unit 9 generates a request signal in response to a command entered by the user and sends the signal to the monitor 5. It should be noted that the block configuration of the terminal unit 9 is similar to that of the monitor 5 which will be described later, and will not be explained.

Figure 2:
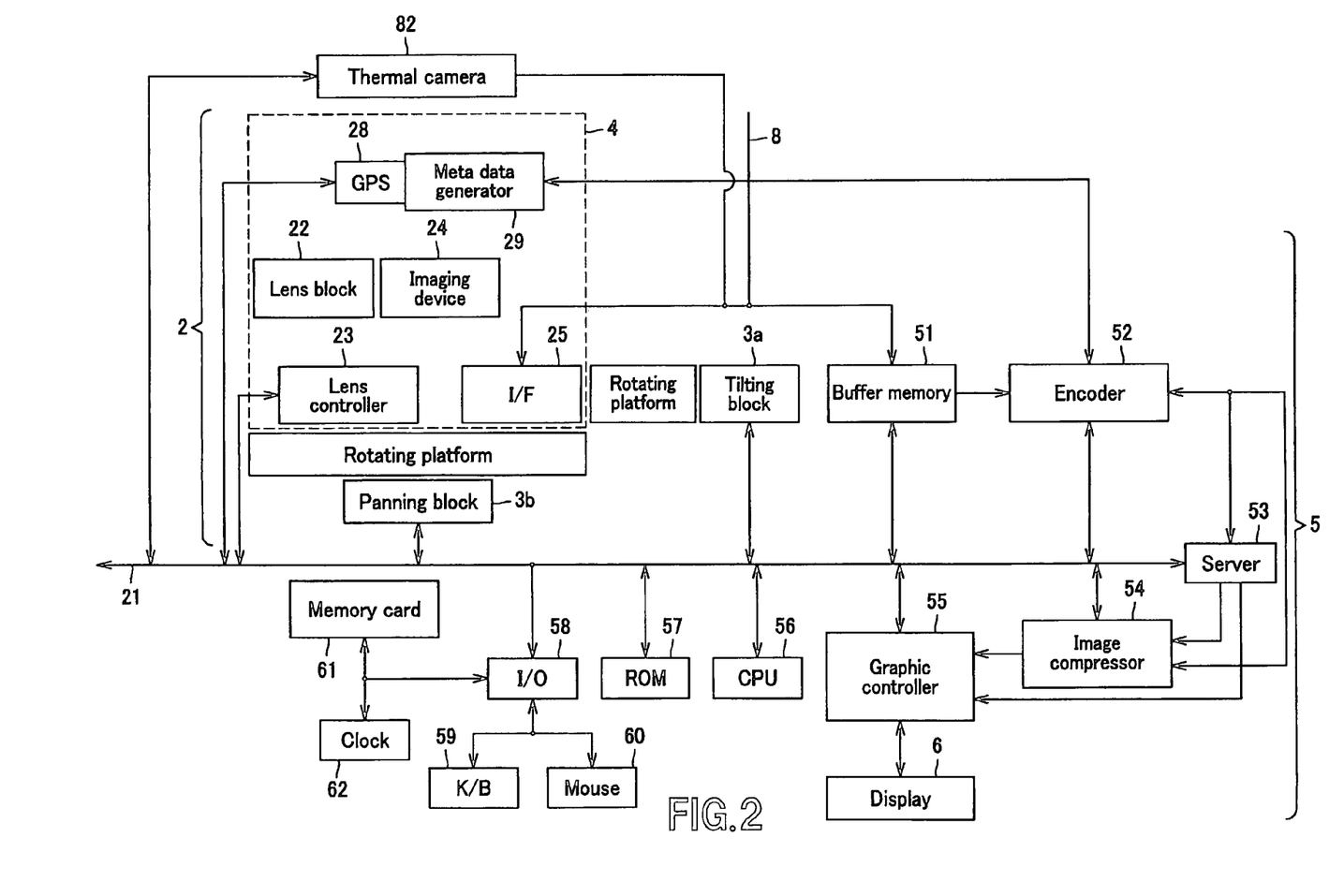
FIG. 2 is a schematic block diagram of a camera unit and monitor.

Next, there will be illustrated and described each of the components of the surveillance/monitoring system 1 according to the present invention with reference to FIG. 2.

As shown in FIG. 2, the color camera unit 2, infrared camera 82 and monitor 5 are connected to a common controller bus 21.

The pan/tilter 3 included in the color camera unit 2 includes a tilting block 3a and panning block 3b for changing the imaging direction. The color camera unit 2 includes a camera block 4. The camera block 4 includes mainly a lens controller 23 to change the angle of view of a lens block 22, imaging device 24 disposed in a position in which it is perpendicular to the optical axis of the lens block 22, IEEE (Institute of Electric and Electronics Engineers) 1394 interface 25 for sending image signals generated by the imaging device 24 to an image input/output unit 13, GPS (Global Positioning System) receiver 28 to detect a present position of the color camera unit 2, and a meta data generator 29 provided in the GPS receiver 28. It should be noted that the IEEE 1394 interface 25 may be replaced with the Ethernet (registered trademark).

The monitor 5 includes a buffer memory 51 connected to the 1394 interface 25, encoder 52 connected to the buffer memory 51, server 53, image compressor 54 to compress an image read from the server 53, graphic controller 55 connected to the server 53 and image compressor 54 to produce an image for display on the display 6, CPU 56 for controlling each component via the controller bus 21, and a memory card 61 and clock 62, connected to an I/O port 58, respectively.

The monitor 5 further includes a keyboard 59 and mouse 60 for use by the user to designate a desired image area and position in an image displayed on the display 6.

In each of the tilting block 3a and panning block 3b, a stepping motor designed as a driving source for the rotating platform is driven to rotate according to a drive signal supplied from the CPU 56. Thus, the imaging direction of the camera block 4 placed on the rotating platform can be changed horizontally or vertically.

The lens controller 23 controls the lens block 22 for automatic aperture control and focus control according to a drive signal supplied from the CPU 56. Also, the lens controller 23 changes the viewing angle in relation to an object according to such a drive signal. Thus, the camera unit 4 can also image the object with the magnification being sequentially adjusted.

The imaging device 24 is a solid-state image sensor such as CCD. In the imaging device 24, an image of the object incident through the lens block 22 is formed on an image screen and converted into an electricity to generate an image signal. The image signal is sent to the IEEE 1394 interface 25.

The GPS receiver 28 is provided to detect a location and imaging direction of the color camera unit 2 according to a signal sent from the GPS system. Especially in case a plurality of color camera units 2 is provided, the GPS receiver 28 permits to control the imaging directions of the color camera units 2 in conjunction with each other. An output signal from the GPS receiver 28 is supplied to the meta data generator 29 provided to generate positional information including a latitude, longitude, bearing, altitude, etc. based on the results of positioning by the GPS system, and meta data including as time and various parameters. The meta data generator 29 supplies the positional information and meta data to the encoder 52. It should be noted that in the present invention, the above GPS receiver 28 and meta data generator 29 may be omitted.

Note that since the infrared camera 82 is constructed similarly to the color camera unit 2, it will not be explained in detail herein.

It should be reminded however that the infrared camera 82 is a thermal camera or IRCCD camera including a thermal image sensor or IRCCD image sensor for sensing infrared radiation emitted from the surface of a human body, for example. Namely, the infrared camera 82 uses a so-called thermography to measure on the surface of the human body temperature variations that form a so-called thermal image or a so-called infrared image. In the infrared camera 82, infrared radiation from the human body are detected by a sensor (not shown) corresponding to the imaging device 24 in the color camera unit 2. In the image sensor (not shown), the intensities of the detected infrared radiation are converted into corresponding electric signals, the electric signals are amplified to predetermined levels, whereby an infrared image can be formed. In the following, the signal forming such an infrared image will be referred to as "infrared image signal".

Note that the infrared camera 82 is designed to capture the image of an object within a set temperature range as an infrared image. By setting the temperature range to about ±3° C. of the human body temperature, it is possible to detect only infrared radiation from the human body in a pin-pointing manner. It should be noted that for the infrared camera 82, the user can freely set a temperature rate by the use of the mouse 60 or the like which will be described in detail later.

The buffer memory 51 is controlled under a control signal supplied from the CPU 56 to provisionally store the image signal and infrared image signal supplied from the IEEE 1394 interface 25. The image signal and infrared image signal provisionally stored in the buffer memory 51 are supplied to the encoder 52 where they will be compression-coded according to the standard such as JPEG (Joint Photographic Experts Group). It should be noted that the encoder 52 may be one that adds position information and meta data supplied from the meta data generator 29 to the image signal and infrared image signal to be compression-coded. The encoder 52 outputs the compression-coded image signal and infrared image signal to the server 53 or image compressor 54. It should be noted that in case the supplied image signal and infrared image signal are not to be compression-coded, the encoder 52 will make no compression-coding.

The server 53 image signals and infrared image signals supplied from the encoder 52 one after another in association with positional information and meta data. It should be noted that the server 53 may be replaced with a hard disk or removable disk-shaped recording medium. Image signal recorded in the server 53 is read out to the image compressor 54 and graphic controller 55 under the control of the CPU 56. Also it should be reminded that with the server 53 being controlled by the CPU 56 to deliver image signal and infrared image signal recorded therein to the memory card 61, the user can move such captured images to another personal computer (PC). Also, with the server 53 being controlled by the CPU 56 to deliver image signal and infrared image signal recorded therein to the aforementioned network server (not shown), the server 53 may be replaced with the network server (not shown).

The image compressor 54 compresses a JPEG-formatted image signal read out of the server 53 into a compressed image or thumbnail image. Also, the image compressor 54 is controlled by the CPU 56 to read an image from the server 53 and generates a moving image. It should be noted that the compression of image data into such a moving image may be done according to MPEG, Motion-JPEG, Motion-JPEG 2000 or the like.

The graphic controller 55 makes graphic processing for the display 6 according to the image signal and infrared image signal read out of the server 53 or image signal and infrared image signal supplied from the image processor 54. Also, the graphic controller 55 is controlled by the CPU 56 to control the contrast and brightness on the display 6.

In case the user designates an image area and position by the use of the keyboard 59 or mouse 60, the CPU 56 sends a drive signal for driving the pan/tilter 3 and lens controller 23 and control signal for controlling each component in the monitor 5 via the controller bus 21. Also, supplied with a predetermined request signal from the terminal unit 9, the CPU 56 selects an optimum still image, moving image or various information recorded in the server 53 and controls the latter to send the image or information to the terminal unit 9.

Next, image pickup operation of the surveillance/monitoring system 1 according to the present invention will be described.

Figure 3:
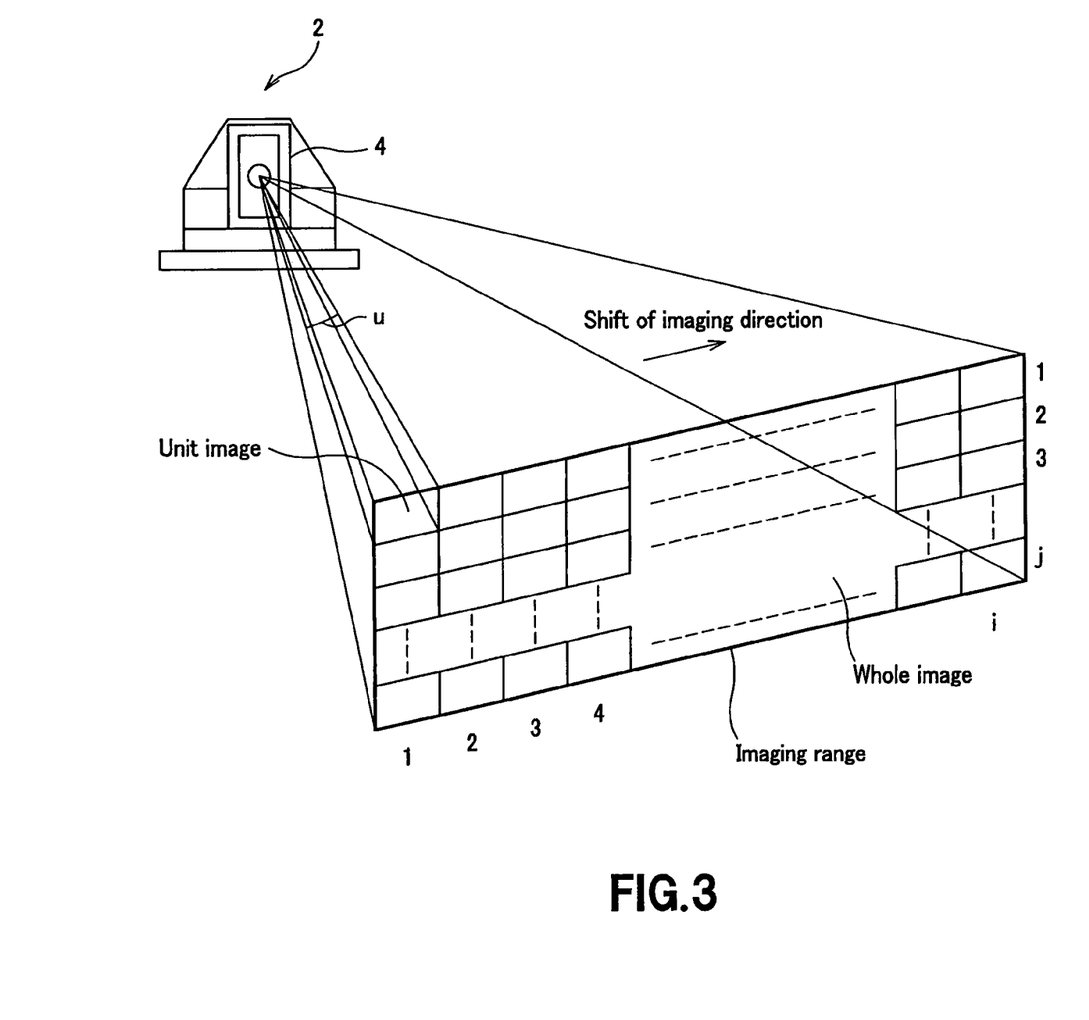
FIG. 3 explains imaging, with the camera unit, of a back-framed viewing range at an angle of view.

As shown in FIG. 3, the color camera unit 2 captures the image a black-framed imaging range at an angle of view u. For covering the entire imaging range at the angle of view u, it is necessary to sequentially shift the imaging direction horizontally or vertically. On the assumption that the size of the imaging range can be represented by i×j times of a size of a frame (will be referred to as "unit image" hereunder) obtained by imaging at an arbitrary angle of view u, it is necessary to set at least i×j kinds of imaging direction. By overlaying i×j unit images captured at the angle of view u one on the other it is possible to synthesize a total image representing the entire imaging range.

On the assumption that an imaging range includes unit images at coordinates (M, N) in which unit images 1, 2, . . . , M, i are laid in this order from the left end of the range along the horizontal coordinate and unit images 1, 2, . . . , N, j are laid in this order from the upper end along the vertical coordinate, the CPU 56 sends a drive signal to the tilting block 3a and panning block 3b to set the imaging direction of the camera block 4 first to upper left coordinates (1, 1) for imaging. An image signal based on a unit image generated by capturing the unit image at the coordinates (1, 1) is provisionally stored in the buffer memory 51 and then compression-coded in the encoder 52 according to the JPEG standard. The image signal has positional information indicative of the imaging direction etc. and meta data sent from the GPS 28 and recorded to the server 53.

Similarly, the CPU 56 sends a drive signal to the tilting block 3a and panning block 3b to shift the imaging direction of the camera bock 4 by one frame rightward to coordinates (2, 1) for imaging. An image signal generated by capturing the image at the coordinates (2, 1) is similarly recorded to the server 53. Under the control of the CPU 56, the camera block 4 will make imaging with its imaging direction being sequentially shifted horizontally to coordinates (3, 1), (4, 1), . . . , (i, 1).

After completion of imaging along the first row of the imaging range, the camera block 4 will be controlled by the CPU 56 to adjust the imaging direction to coordinates (1, 2) in a second row for imaging, and then sequentially shift the imaging direction horizontally for imaging. Upon completion of imaging up to coordinates (1, j) after repetition of the above operations, the server 53 will have recorded therein images signals which are based on the i×j unit images each captured at each of the coordinates.

Note here that the image signals based on the unit images recorded in the server 53 are read one after another by the image compressor 54 and compressed to fir the size of a display screen of the display 6. The unit images thus compressed are passed through the graphic controller 15 and displayed on the display 6. All the i×j unit images recorded in the server 53 are displayed on the display 6 to synthesize one panoramic whole image (panoramic image). By carrying out the aforementioned imaging operations at regular intervals, it is possible to acquire a whole image depicting the latest scene covered by the imaging range of the camera block 4 and store and manage such whole images in the server 53.

Figure 4:
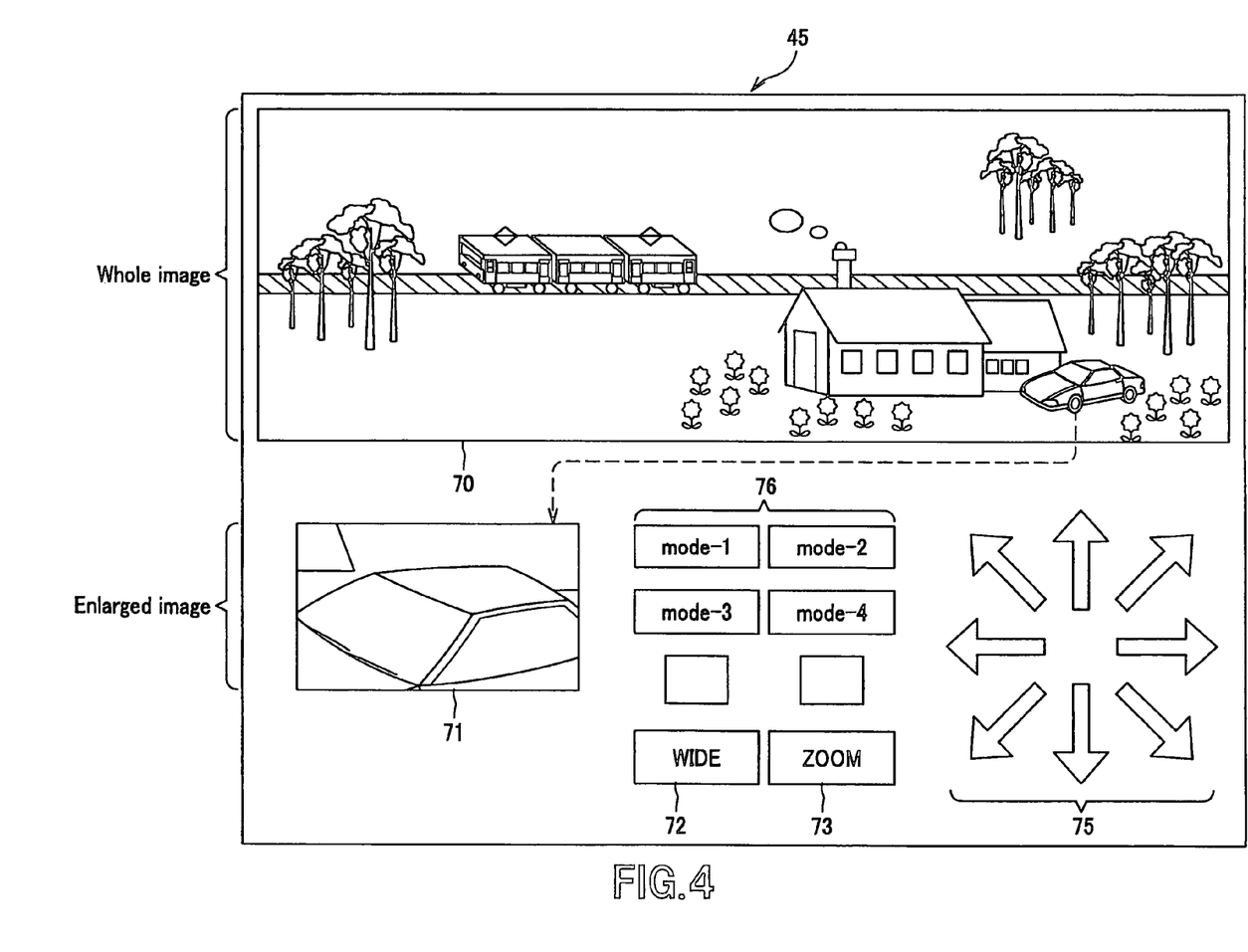
FIG. 4 shows an example of the composition of a viewing area on a display.

FIG. 4 shows an example in which a whole image synthesized by overlaying the i×j unit images captured by the camera block 4 is displayed on a whole-image display area 70 of the display 6. Note that the monitor 5 may be adapted to depict the seam or boundary between unit images forming together the whole image in the whole-image display area 70 or display only a seamless whole image in the display area 70. Also, the monitor 5 may be designed to display, in the whole-image display area 70, one whole image captured at an angle of view at which an entire imaging range in place of the panoramic whole image.

The display 6 has a display screen 45. As shown, the display screen 45 further includes an enlarged-image display area 71 in which a unit image is displayed with an increased scale factor. In this enlarged-image display area 71, there may be displayed a user-designed one of unit images forming together a whole image displayed on the whole-image display area 70 or there may be displayed such user-designated unit images in the sequence of their imaging directions. Thus, the user can check the imaging direction of each of the designated unit images on the real-time basis.

Using the keyboard 59 or mouse 60, the user can designate a desired image area and position in the whole-image display area 70 and enlarged-image display area 71. It should be noted that in each of the display areas 70 and 71, there may also be displayed a crisscross line or pointer for making an operation for the above-mentioned designation synchronously with the movement of the mouse 60 or the like.

Making an operation for entry to the display screen 45 using keys 72, 73, 75 and 76 instead of the mouse 60, it is possible to increase or decrease the scale factor of a unit image displayed in the enlarged-image display area 71, control the imaging direction for horizontal or vertical adjustment of the imaging direction of the camera block 4, and set a desired one of various possible modes.

Note that by operating the infrared camera 82 in the same manner as the color camera unit 2, it is possible to form a panoramic infrared image.

Figure 5:
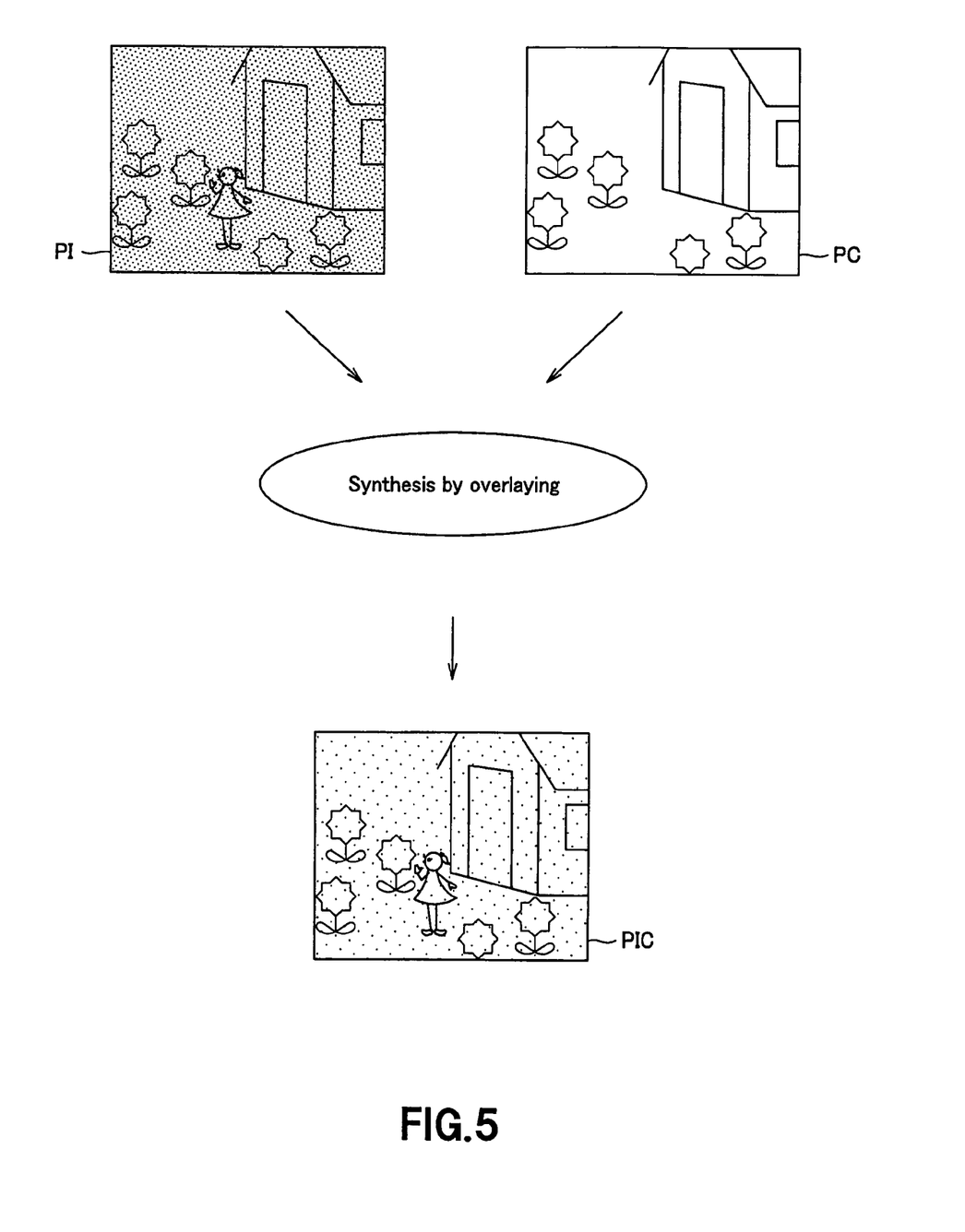
FIG. 5 shows an example of the synthetic image displayed on the display.

The monitor 5 in the surveillance/monitoring system 1 according to the present invention stores and manages panoramic color images generated by overlaying a plurality of unit images captured in colors by the color camera unit 2 and panoramic infrared images generated by overlaying a plurality of unit images captured by infrared radiation measurement by the infrared camera 82. As shown in FIG. 5, for example, the monitor 5 overlays a color image PC corresponding to the position of the object imaged by the infrared camera 82 in a panoramic color image stored and managed in the server 5 on an image PI of an object captured on a real-time basis by controlling the imaging direction of the infrared camera 82 to a desired direction to provide a synthetic image PIC for display on the display 6.

Figure 6:
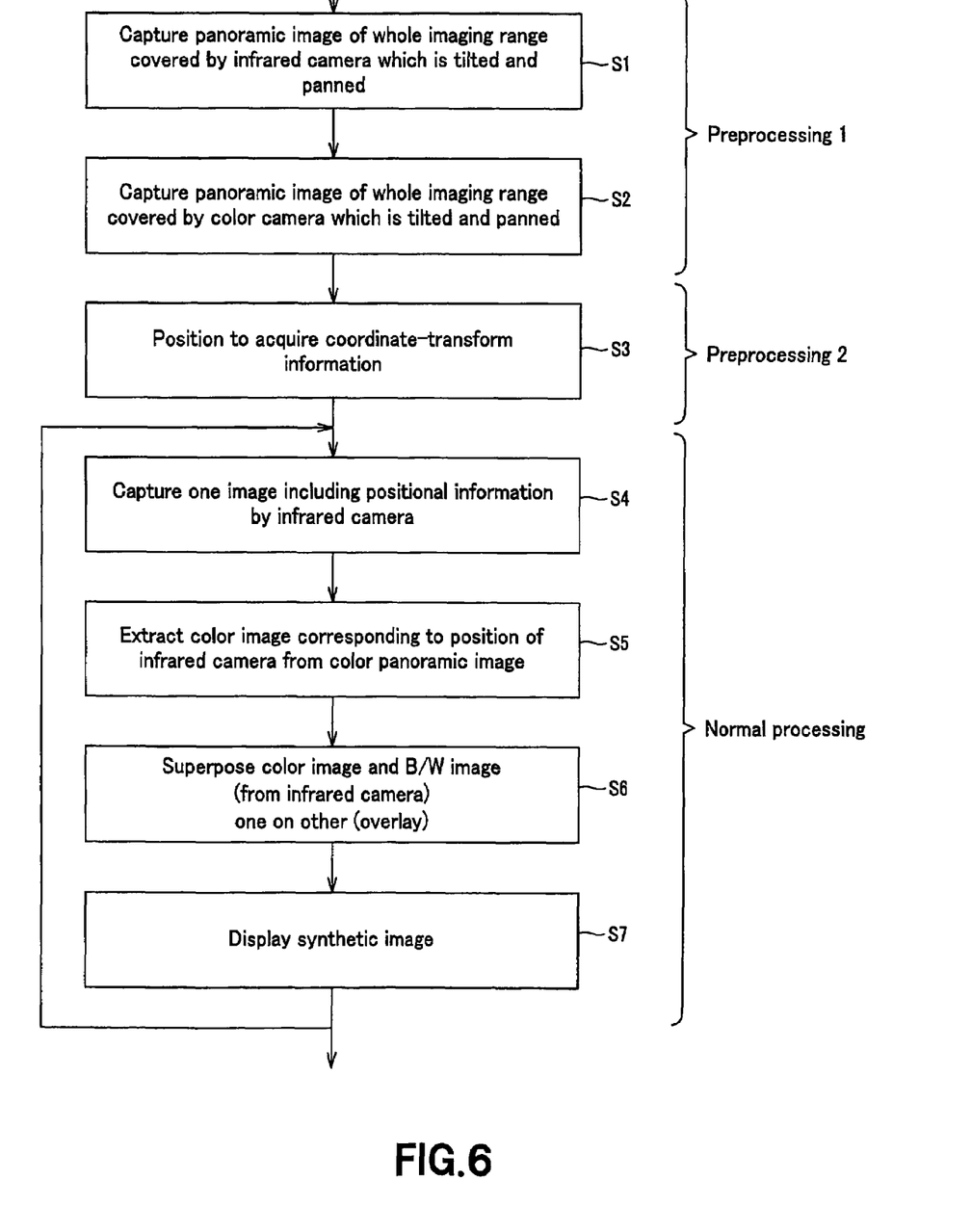
FIG. 6 shows a flow of operations made in imaging control by the monitor 5 in the surveillance/monitoring system.

That is, in the monitor 5 in the surveillance/monitoring system 1, the CPU 56 controls the imaging operation according to an imaging control program stored in a ROM 57 as shown in the flow diagram in FIG. 6.

Figure 7A:
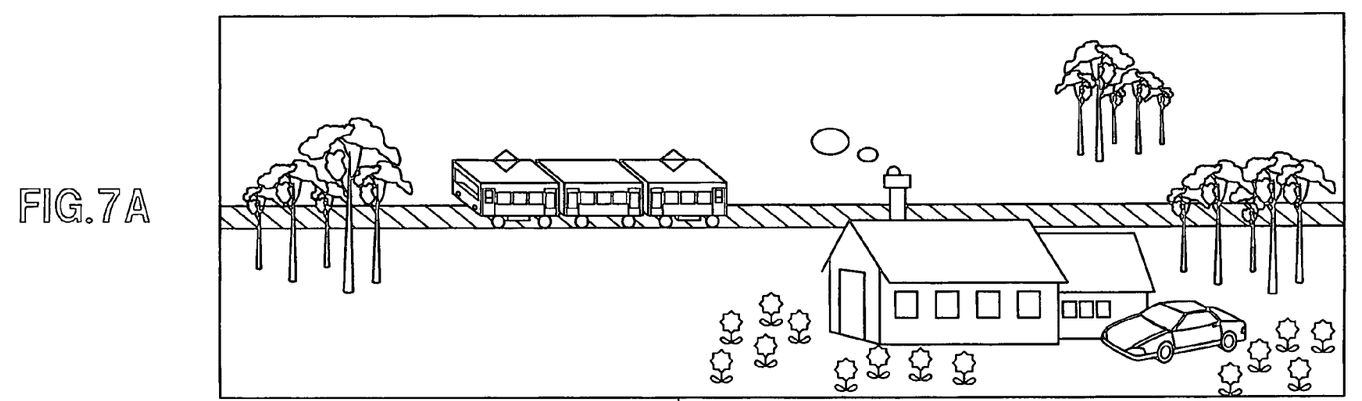
FIG. 7 schematically illustrates the content of preprocessing 1 in the imaging control.
Figure 7B:
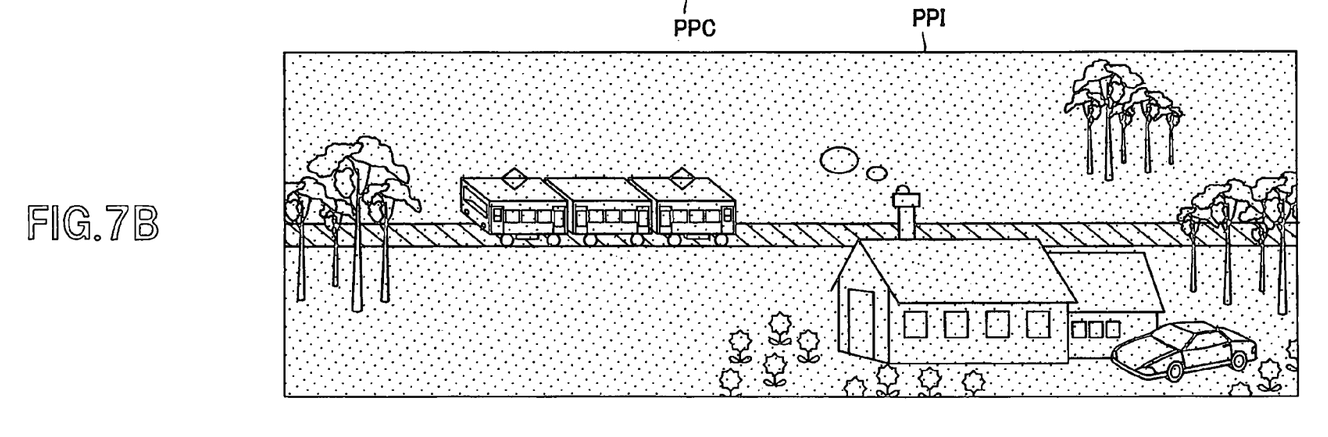

In a preprocessing 1 in the imaging control procedure, a whole imaging range is captured by both the color camera unit 2 and infrared camera 82 to form a panoramic image PPC and this image PPC is stored and managed in the server 53 (in steps S1 and S2) as shown in FIGS. 7A and 7B.

More specifically, in step S1, the whole imaging range is captured in colors by the color camera unit 2 to provide a plurality of color unit images, the unit images are overlaid one on the other to form a panoramic color image PPC, and the image PPC is stored and managed in the serer 53.

In next step S2, the whole imaging range is captured by infrared radiation measurement by the infrared camera 82 to provide a plurality of infrared unit images, the unit images are overlaid one on the other to form a panoramic infrared image PPI, and the image PPI is stored and managed in the server 53.

Figure 8:
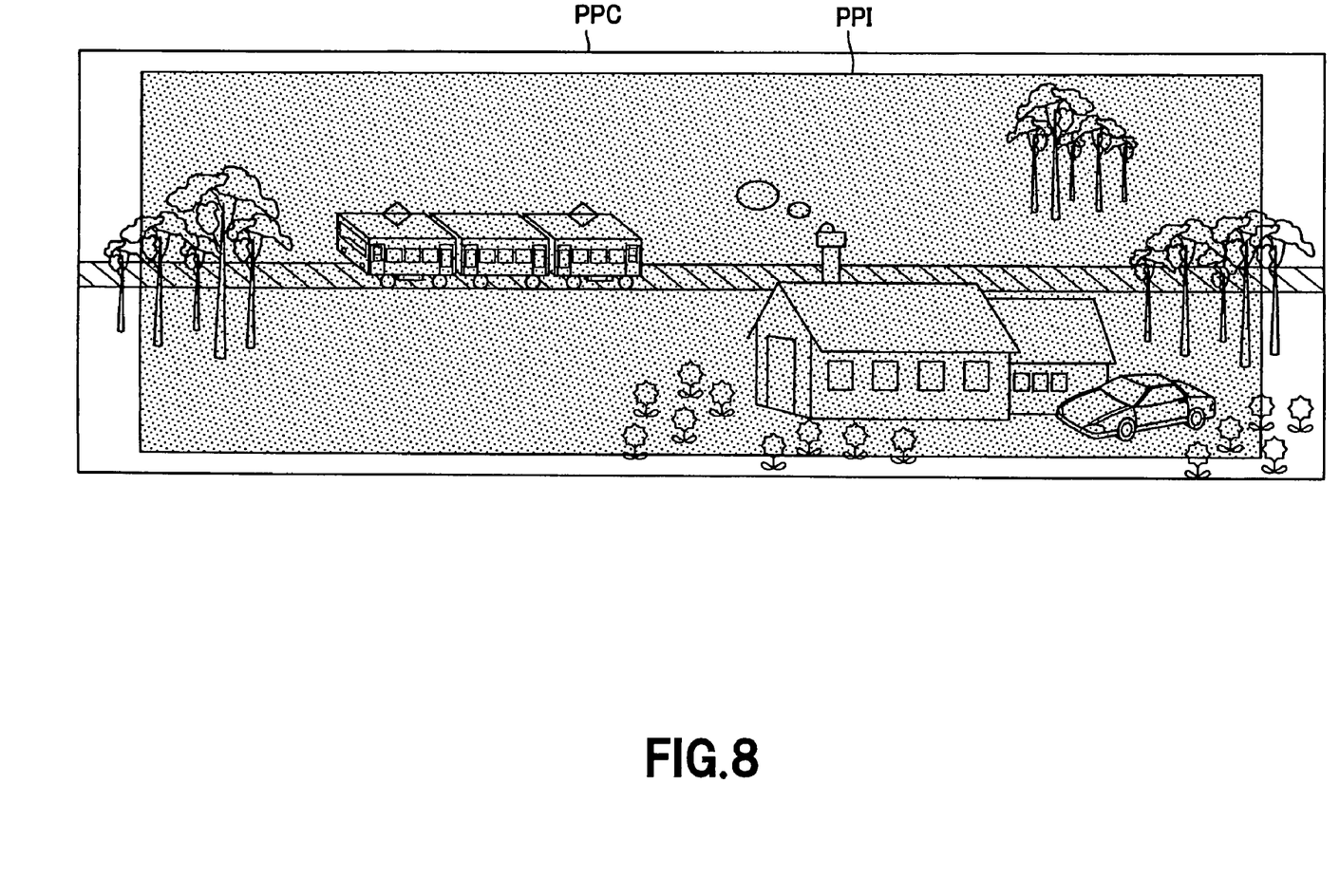
FIG. 8 schematically illustrates the content of preprocessing 2 in the imaging control.

In a second preprocessing 2 in the imaging control procedure, two panoramic images PPC and PPI are positioned in relation to each other as shown in FIG. 8 to obtain coordinate-transform information on the color camera unit 2 and infrared camera 82 (in step S3).

More specifically, in step S3, a panoramic color image formed by overlaying a plurality of unit images captured in colors one on the other one on the other and a panoramic infrared image formed by overlaying a plurality of unit images captured by infrared radiation measurement are positioned in relation to each other to generate coordinate-transform information on the imaging positions of the panoramic color and infrared images.

Figure 9A:
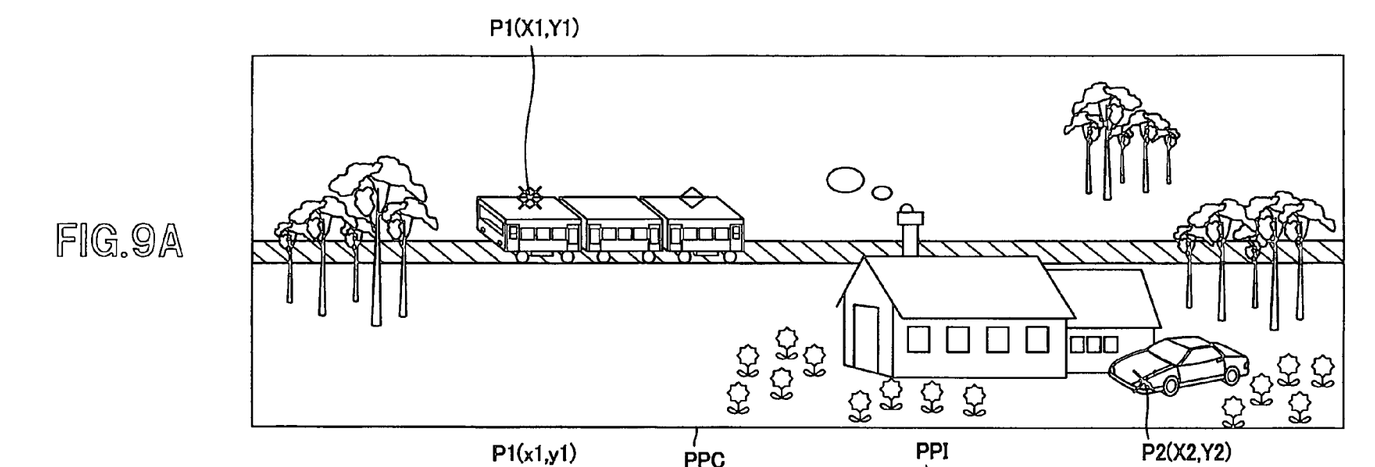
FIG. 9 explains the generation of coordinate-transform information on an imaging position in the imaging control.
Figure 9B:
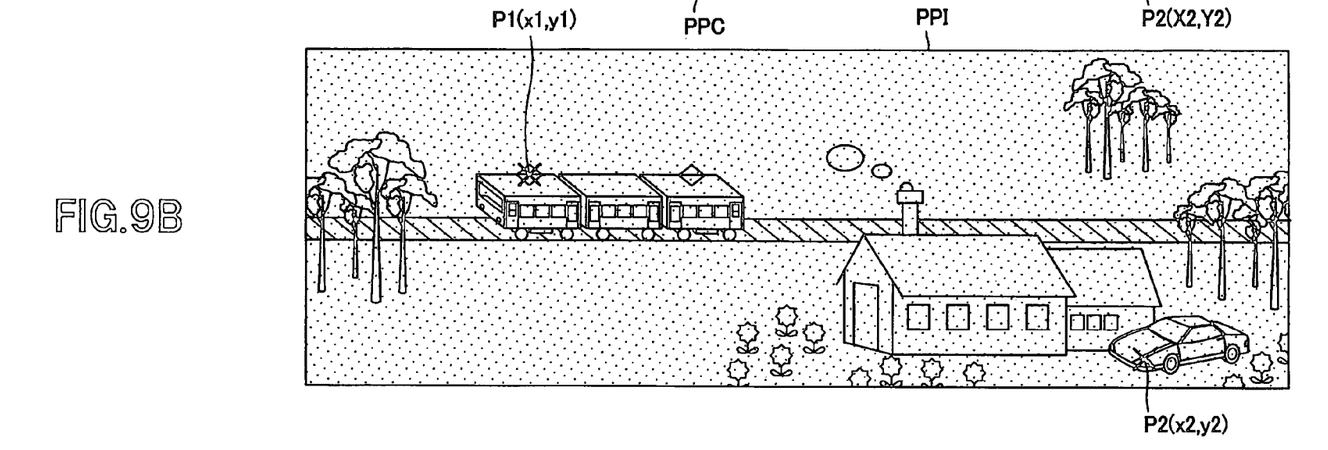

On the assumption that the panoramic color and infrared images are in a distortion-free two-dimensional plane, the imaging positions (X, Y) and (x, y) of the panoramic color and infrared images have a relation given below as shown in FIG. 9, for example:

$X = ax + b$ $Y = cy + d$

By determining two points P1 and P2 at coordinates indicative of the same object in the respective panoramic images, the factors a, b, c and d can be determined.

With the preprocessing 1 and preprocessing 2 (in steps S1 to S3) having been effected previously, the following normal processing (in steps S4 to S7) are effected during surveillance at night.

That is, in the normal processing, the monitor 5 captures the image of an object with the imaging direction of the infrared camera 82 being controlled to a desired one in the imaging range to acquire an infrared image including positional information in step S4.

In next step S5, a color image corresponding to the position where the object has been imaged in step S4 is extracted from among the panoramic color images stored and managed in the server 53 on the basis of the positional information included in the infrared image acquired in step S4.

In next step S6, a color image corresponding to the imaging position of the object is overlaid on the infrared image to form a synthetic image.

Then in step S7, the synthetic image formed by the overlaying in step S6 is displayed on the display 6.

By overlaying the color image included in the panoramic color imaged and corresponding to the imaging position of the object on the infrared image acquired by capturing the image of the object by infrared radiation measurement with the imaging direction being controlled to the desired one in the imaging range to synthesize a color image, and displaying the synthetic color image, it is possible to display an area where the object exists with a luminance distribution of the infrared image even at night and thus definitely identify, in the synthetic image, the position of the area where the object exists in a relation with the background of the object. Also, since it is possible to prevent overlooking of any slight motion of a human being, the prevent invention permits a higher-definition surveillance/monitoring.

Further, with such synthetic images being stored in the server 53 in the imaging system 1, the user of the terminal unit 9, accessing the monitor 5 via the network 8, can view such a synthetic image on the terminal display 10. In case a plurality of such terminal units 9 is connected to the imaging system 1 via the network 8, a plurality of users can view a synthetic image at the same time. Moreover, with the synthetic images being stored one after another in the server 53, the user of each terminal unit 9 can evoke synthetic images of the past from the server 53 for checking in detail.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
   a color imaging means for making color imaging with an imaging direction being sequentially adjusted for each of a plurality of color unit images forming together a panoramic color image;
   an infrared imaging means for imaging by infrared radiation measurement with the imaging direction being sequentially adjusted for each of a plurality of infrared unit images forming together a panoramic infrared image;

a panoramic image storing/managing means for storing/managing the panoramic color image produced by overlaying the plurality of color unit images one color unit image on another color unit image and the panoramic infrared image produced by overlaying the plurality of infrared unit images one infrared unit image on another infrared unit image;

an image synthesizing means for overlaying, on an infrared image of an object imaged by controlling the imaging direction by the infrared imaging means to a predetermined imaging direction in an imaging range, a color image corresponding to a location, where the object has been imaged by the infrared imaging means, in a panoramic color image stored/managed in the panoramic image storing/managing means; and an image displaying means for displaying a resultant image produced by the overlaying by the image synthesizing means.

2. The imaging device according to claim 1, wherein the panoramic image storing/managing means positions the panoramic color image produced by overlaying the color unit images one color unit image on another color unit image in relation to the panoramic infrared image produced by overlaying the infrared unit images one infrared unit image on another infrared unit image to generate transform information on a position of imaging by the color imaging means and a position of imaging by the infrared imaging means, and supplies the image synthesizing means with color images corresponding to the position of imaging by the infrared imaging means on the basis of the transform information.

3. An imaging method comprising the steps of:
making a color imaging with an imaging direction being sequentially set for each of a plurality of color unit images forming together a panoramic color image;
imaging by infrared radiation measurement with the imaging direction being sequentially set for each of a plurality of infrared unit images forming together a panoramic infrared image;
storing/managing the panoramic color image produced by overlaying the plurality of color unit images one color unit image on another color unit image and the panoramic infrared image produced by overlaying the plurality of infrared unit images one infrared unit image on another infrared unit image;
imaging an object by infrared radiation measurement with the imaging direction being controlled to a predetermined imaging direction within an imaging range;
overlaying, on an infrared image of the object, a color image corresponding to a location, where the object has been imaged in the infrared imaging step, in a panoramic color image stored/managed in the panoramic image storing/managing step; and
displaying a resultant image produced by the overlaying in the image synthesizing step.

4. The imaging method according to claim 3, wherein in the panoramic image storing/managing step, the panoramic color image produced by overlaying the color unit images one color unit image on another color unit image is positioned in relation to the panoramic infrared image produced by overlaying the infrared unit images one infrared unit image on another infrared unit image to generate transform information on a position of imaging in the color imaging step and that of imaging in the infrared imaging step; and
in the image synthesizing step, a synthetic image is produced by overlaying, on an infrared image, a color image included in the panoramic color image and corresponding to the position of imaging in the infrared imaging step on the basis of the transform information.

5. A computer program product on a computer-readable medium, the computer program product causing a computer to execute an imaging controlling process comprising the steps of:
making a color imaging with an imaging direction being sequentially set for each of a plurality of color unit images forming together a panoramic color image;
imaging by infrared radiation measurement with an imaging direction being sequentially set for each of a plurality of infrared unit images forming together a panoramic infrared image;
storing/managing a panoramic color image produced by overlaying the plurality of color unit images one color unit image on another color unit image and a panoramic infrared image produced by overlaying the plurality of infrared unit images one infrared unit image on another infrared unit image;
imaging an object by infrared radiation measurement with the imaging direction being controlled to a predetermined imaging direction within an imaging range;
overlaying, on an infrared image of an object, a color image corresponding to a location, where the object has been imaged in the infrared imaging step, in a panoramic color image stored/managed in the panoramic image storing/managing step; and displaying a resultant image produced by the overlaying in the image synthesizing step.

6. An imaging system comprising:
a color imaging device configured to make color imaging with an imaging direction being sequentially adjusted for each of a plurality of color unit images forming together a panoramic color image;
an infrared imaging device configured to image by infrared radiation measurement with the imaging direction being sequentially adjusted for each of a plurality of infrared unit images forming together a panoramic infrared image; and
a controller configured to control a plurality of operations of the color imaging device and infrared imaging device via a network, the controller including
a panoramic image storing/managing unit configured to store/manage a panoramic color image produced by overlaying the plurality of color unit images one color unit image on another color unit image and a panoramic infrared image produced by overlaying the plurality of infrared unit images one infrared unit image on another infrared unit image,
an image synthesizing unit configured to overlay, on an infrared image of an object imaged by controlling the imaging direction by the infrared imaging device to a predetermined imaging direction in an imaging range, a color image corresponding to a location, where the object has been imaged by the infrared imaging device, in a panoramic color image stored/managed in the panoramic image storing/managing unit, and
an image displaying unit configured to display a resultant image produced by the overlaying by the image synthesizing unit.

7. An imaging device comprising:
a color camera unit configured to image in color with an imaging direction being sequentially adjusted for each of a plurality of color unit images forming together a panoramic color image;
an infrared camera configured to image by infrared radiation measurement with the imaging direction being sequentially adjusted for each of a plurality of infrared unit images forming together a panoramic infrared image;

a server configured to store and manage the panoramic color image produced by overlaying the plurality of color unit images one color unit image on another color unit image and the panoramic infrared image produced by overlaying the plurality of infrared unit images one infrared unit image on another infrared unit image;

an image synthesizer configured to overlay, on an infrared image of an object imaged by controlling the imaging direction by the infrared camera to a predetermined imaging direction in an imaging range, a color image corresponding to a location, where the object has been imaged by the infrared camera, in a panoramic color image stored/managed in the server; and an image display configured to display a resulting image produced by the overlaying by the image synthesizer.

8. An imaging system comprising:

a color camera device configured to image in color with an imaging direction being sequentially adjusted for each of a plurality of color unit images forming together a panoramic color image;

an infrared camera configured to image by infrared radiation measurement with the imaging direction being sequentially adjusted for each of a plurality of infrared unit images forming together a panoramic infrared image; and a controller configured to control a plurality of operations of the color camera unit device and infrared camera via a network, the controller including a server configured to store/manage the panoramic color image produced by overlaying the plurality of color unit images one color unit image on another color unit image and the panoramic infrared image produced by overlaying the plurality of infrared unit images one infrared unit image on another infrared unit image, an image synthesizer configured to overlay, on an infrared image of an object imaged by controlling the imaging direction by the infrared camera to a predetermined imaging direction in an imaging range, a color image corresponding to a location, where the object has been imaged by the infrared camera, in a panoramic color image stored/managed in the server, and an image display configured to display a resultant image produced by the overlaying by the image synthesizer.

* * * * *